(12) United States Patent
Heckman et al.

(10) Patent No.: US 12,175,169 B2
(45) Date of Patent: Dec. 24, 2024

(54) METHOD OF DESIGNING A SWITCHGEAR WITH ARC-FLASH SIMULATION AND ENERGY TRANSMISSION THEREOF

(71) Applicant: TECHNOLOGIES DUAL-ADE INC., Sherbrooke (CA)

(72) Inventors: Jeffrey Heckman, Fairport (CA); Anaele Pin, Sherbrooke (CA)

(73) Assignee: TECHNOLOGIES DUAL-ADE INC., Lachine (CA)

( * ) Notice: Subject to any disclaimer, the term of this patent is extended or adjusted under 35 U.S.C. 154(b) by 993 days.

(21) Appl. No.: 17/073,309

(22) Filed: Oct. 17, 2020

(65) Prior Publication Data

US 2021/0117592 A1 Apr. 22, 2021

Related U.S. Application Data

(60) Provisional application No. 62/923,018, filed on Oct. 18, 2019.

(51) Int. Cl.
*G06F 30/20* (2020.01)
*G06F 30/10* (2020.01)
(Continued)

(52) U.S. Cl.
CPC .............. *G06F 30/20* (2020.01); *G06F 30/10* (2020.01); *G06F 30/23* (2020.01);
(Continued)

(58) Field of Classification Search
CPC .......... G06F 30/20; G06F 30/25; G06F 30/27; G06F 30/28; G06F 30/10; G06F 30/23;
(Continued)

(56) References Cited

U.S. PATENT DOCUMENTS 6,058,134 A 5/2000 Toivonen
7,778,013 B2 8/2010 Bruski
(Continued)

FOREIGN PATENT DOCUMENTS

WO WO 2012/051029 4/2012
WO WO 2014/203692 12/2014

OTHER PUBLICATIONS

Armijo, Kenneth Miguel, et al. Arc-Fault Primer: Numerical, Analytical, and Experimental Characteristics of Initiation and Sustainment of Arc Plasmas (Draft). No. SAND2017-1019. Sandia National Lab.(SNL-NM), Albuquerque, NM (United States), 2016. (Year: 2016).*

(Continued)

*Primary Examiner* — Michael Edward Cocchi
(74) *Attorney, Agent, or Firm* — Benoit & Cote inc.; Mathieu Audet

(57) ABSTRACT

A method of evaluating a stress applied to components of a switchgear cabinet for sustaining an arc-flash with an arc-flash event simulation and energy transmission thereof is presented with steps comprising providing a location of the arc-flash in an internal volume of the switchgear cabinet, simulating the arc-flash as a local ambient boundary condition at the location of the arc flash with an input energy, diffusing the input energy in an air domain inside the switchgear cabinet, applying the input energy as a thermal history to specific arc-flash elements, multiplying the thermal history by specific heat to calculate energy units at the arc-flash, identifying a desired thermal energy magnitude and history of deposition and calibrating the desired thermal history to substantially match an estimated mechanical power generated by the arc-flash.

12 Claims, 24 Drawing Sheets

(51) Int. Cl.
*G06F 30/23* (2020.01)
*G06F 111/10* (2020.01)
*G06F 119/02* (2020.01)
G06F 113/08 (2020.01)
G06F 119/08 (2020.01)

(52) U.S. Cl.
CPC ....... *G06F 2111/10* (2020.01); *G06F 2113/08* (2020.01); *G06F 2119/02* (2020.01); *G06F 2119/08* (2020.01)

(58) Field of Classification Search
CPC .. G06F 30/367; G06F 30/398; G06F 2111/10; G06F 2113/08; G06F 2119/02; G06F 2119/08; G06F 2119/06; Y02E 60/00; Y04S 40/20; H01H 33/202; H01H 31/003; H01H 33/53; H02B 1/18; H02B 3/00
See application file for complete search history.

(56) References Cited

U.S. PATENT DOCUMENTS

| | | |
|---|---|---|
| 8,155,908 B2 | 4/2012 | Nasle |
| 8,649,139 B2 | 2/2014 | Roscoe |
| 8,762,085 B2 | 6/2014 | Smith |
| 9,146,267 B2 | 9/2015 | Lee |
| 2007/0108986 A1* | 5/2007 | Moore ................ G01R 35/007 340/657 |
| 2009/0113049 A1* | 4/2009 | Nasle ...................... G06N 7/06 709/224 |
| 2014/0192451 A1* | 7/2014 | Locker ................ H02H 1/0023 361/103 |
| 2015/0112907 A1 | 4/2015 | Nasle |
| 2015/0233974 A1* | 8/2015 | Lagree ..................... H02H 5/12 702/62 |
| 2016/0246905 A1* | 8/2016 | Radibratovic .......... G06F 30/20 |
| 2018/0323022 A1* | 11/2018 | Skibinski ............... H01H 33/08 |
| 2019/0034569 A1 | 1/2019 | Radibratovic |

OTHER PUBLICATIONS

Uzelac, N., et al. "Tools for the simulation of the effects of the internal arc in transmission and distribution switchgear." Working Group A. vol. 3. 2015. (Year: 2017).*

Milovac, Predrag, and Ashok Kulkarni. "Compact metal-clad 15 kV arc-resistant switchgear: Simulation and test results." 2011 IEEE Industry Applications Society Annual Meeting. IEEE, 2011. (Year: 2011).*

Land, H. Bruce, et al. "Design of a sensor to predict arcing faults in nuclear switchgear." IEEE Transactions on Nuclear Science 50.4 (2003): 1161-1165. (Year: 2003).*

Kumar, Parkash, et al. "Internal arc fault simulation in medium voltage panel for thermal and structural withstand." 2018 IEEE Holm Conference on Electrical Contacts. IEEE, 2018. (Year: 2018).*

Porkholm, Martin. Structural response in arc flash event. MS thesis. 2015. (Year: 2015).*

Uzelac, Nenad. "Tools for the Simulation of Internal Arc Effects in Mv and HV Switchgear" Sep. 2014 IEEE Switchgear standard meeting. IEEE, 2014 (Year: 2014).*

* cited by examiner

METHOD OF DESIGNING A SWITCHGEAR WITH ARC-FLASH SIMULATION AND ENERGY TRANSMISSION THEREOF

CROSS-REFERENCES

The present United States patent application relates to and claims priority under 35 U.S.C. 119 (e) from U.S. Provisional Patent Application No. 62/923,018, filed Oct. 18, 2019, entitled METHOD OF DESIGNING A SWITCHGEAR WITH ARC-FLASH SIMULATION AND ENERGY TRANSMISSION THEREOF, which is incorporated herein by reference in its entirety.

BACKGROUND OF THE INVENTION

1. Field of the Invention

This invention generally relates to a method of simulating an arc-flash and designing a switchgear adapted to sustain the energy produced by the arc-flash. More precisely, the present invention relates to numerical modelisation of an arc-flash in a virtual switchgear to design and dimension physical switchgear components.

2. Description of the Related Art

Switchgears, or electrical cabinets, are use in the electric field to receive therein electrical components. Cabinets are used to protect users and the surrounding environment against arc-flashes that can produce a significant amount of energy. Arc-flash can represent safety issues because of the energy they are producing and should be contained in cabinets sized and designed to sustain the energy produced by the arc-flash.

Cabinets are generally designed by trial and errors simulating real arc-flashes in a physical cabinet design to evaluate damages on the cabinet and perform design changes to, ultimately, design and dimension components of the cabinet with sufficient mechanical strength. This iterating process is long, costly and should be done for each specific situation considering these are destructive tests. Tangible tests are also required to confirm compliance with, for example, IEEE C37.20.7 type test for arc-flash. The resulting cabinet structure is hardly optimized in some respects given the lack of precise data to optimally dimension the cabinet.

Attempts to simulate arc-flashes using compressed air injection in a cabinet have shown that compressed air injection has some limitations and provide a "slow" pressure application ramp up that is not sufficiently representative of real case scenarios facing a more intense reality.

Other attempts to simulate arc-flashes using dynamite (TNT) in a switchgear has demonstrated the TNT gases expand after detonation, energy is deposited on a volume whereas the arc energy deposition is limited to immediate vicinity of the arc. The timeframe of the TNT detonation cannot be controlled which makes that simulation difficult to use and be representative of real-life scenarios.

It is therefore desirable to improve methods of designing and manufacturing switchgear cabinets in order to decrease the number of tries and errors involving manpower and physical components.

It is therefore desirable to provide a method to numerically simulate an arc-flash energy input in a mechanical object.

It is therefore desirable to provide a tool and a method to numerically simulate an arc-flash in a cabinet to validate the resistance and the strength of the switchgear.

It is desirable to convert arc-flash energy into usable data input for use in a finite element analysis application.

It is desirable to use a power curve, in function of time, applied to an air volume in a virtual cabinet to dimension components of the cabinet.

It is desirable to provide tools and a method for simulating an arc-flash in a cabinet constructed with a plurality of components.

It is equally desirable to provide a tool and a method to virtually build a cabinet with virtual components having known respective mechanical strengths that, once assembled, are going to provide a consequently dimensioned cabinet adapted to sustain a predetermined arc-flash energy applied therein.

It is equally desirable to provide a tool and a method to virtually build a new physical cabinet or to improve an existing physical cabinet with physical components similar to the virtual components determined through simulation that, once assembled, are going to provide a consequently dimensioned cabinet adapted to sustain the predetermined arc-flash energy applied therein.

It is also desirable to provide a tool and a method for predictively design a cabinet capable of sustaining a pre-evaluated amount of art-flash energy therein.

Other deficiencies and opportunities will become apparent to one skilled in the art to which the invention pertains in view of the following summary and detailed description with its appended figures.

SUMMARY OF THE INVENTION

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is generally described as a method, a system and/or a device for improving the design process of a physical switchgear cabinet by using a virtually a cabinet on a basis of an arc-flash simulation in a numerical environment.

The invention is generally described as a method, a system and/or a device for improving the design process of a physical switchgear cabinet by using a virtually validate the mechanical strength of a virtual cabinet assembly on a basis of an arc-flash simulation in a numerical environment instead of iterative destructive tests of arc-flashes in a physical cabinet.

Aspects of our work provide a transfer of arc-flash energy data into other units usable as inputs for numerical analysis methods for dimensioning a physical cabinet structure.

Aspects of the invention provide a way to estimate an electrical energy for a numerical simulation input to dimension a cabinet capable of sustaining an arc-flash in the cabinet.

Aspects of the invention provide a method of characterizing an arc-flash energy from an electrical power to define an input usable for numerical analyses.

Aspects of the invention provide an input parameter for a model representing an arc-flash with a corresponding energy.

Aspects of our work provide a transfer of arc-flash energy data into corresponding heat energy units usable as inputs for numerical analysis methods for dimensioning a physical cabinet structure.

Aspects of our work provide a temperature input on a small air volume in a virtual cabinet, the temperature is expanding in function of a predetermined temperature to generate a power.

Aspects of our work provide a power curve, in function of time, applied to an air volume in a virtual cabinet to dimension components of the cabinet.

One aspect of the instant invention provides, in accordance with at least one embodiment thereof, a method of selecting virtual cabinet components assembled in a cabinet in a virtual environment on a basis of an arc-flash simulation.

One aspect of the instant invention provides, in accordance with at least one embodiment thereof, a method to virtually simulate an arc-flash energy transmission in a cabinet.

Another aspect of the invention is using an electric power to identify the power of an arc-flash in the cabinet in function of time.

Another aspect of the invention is using a calculated arc-flash energy input to simulate a virtual cabinet behavior in response to a corresponding air pressure increase. The energy input is based on power curve that is based on a temperature curve.

One other aspect of the invention is using a temperature increase over time to expand an air volume in a cabinet that is creating a pressure, that pressure influences the cabinet structure with mechanical stresses. The mechanical stresses induced on the cabinet structure are analyzed to remain under the plastic deformation of the cabinet material to prevent plastic and permanent deformation or rupture of the cabinet.

Moreover, one other aspect of the instant invention provides, in accordance with at least one embodiment thereof, a repeatable method for numerically dimension a cabinet prior to physically building the cabinet.

One aspect of the instant invention provides, in accordance with at least one embodiment thereof, a conversion of power over time into pressure over time to convert the energy input data into a physically applicable input unit for numerical analysis.

One aspect of the instant invention provides, in accordance with at least one embodiment thereof, a method to allow a numerical analysis application configured to work with units having a physical effect on a structure with a conversion of power unit into pressure unit.

In one aspect of the instant invention, in accordance with at least an embodiment thereof, a numerical arc-flash energy transmission analysis is perform in the fluid domain characterizing the internal air volume of a virtual cabinet and after analyzing the energy transmission in the material domain characterizing the cabinet components to evaluate the impact of the arc-flash energy transmission to the virtual cabinet.

One aspect of the instant invention provides, in accordance with at least one embodiment thereof, a method to virtually simulate a about 15 to 25 milliseconds arc-flash energy transmission in a cabinet. A about 20 milliseconds arc-flash energy transmission in a cabinet is generally representative of the physical effect of the arc-flash on a physical cabinet.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Figure 1:
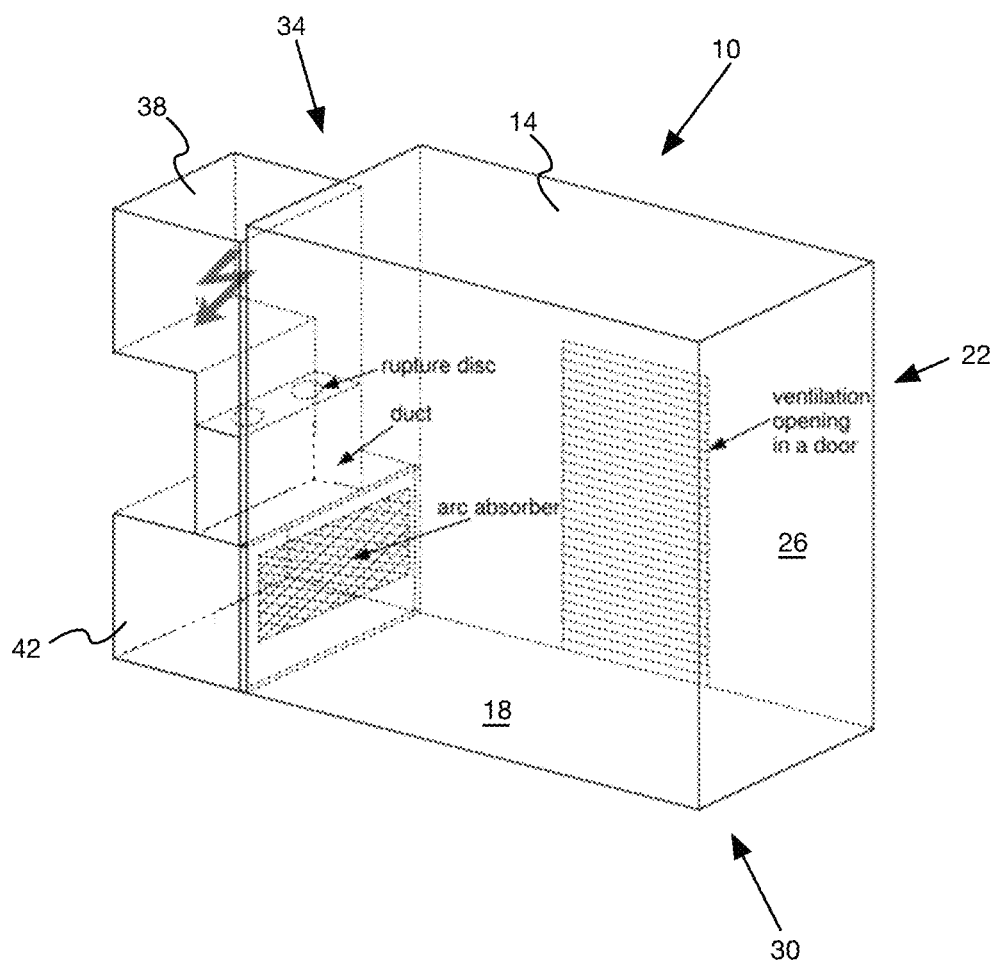
FIG. 1 is a schematic isometric view of a cabinet in accordance with at least one embodiment of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring the drawings, one or more preferred embodiments of the invention are next described. The following description of one or more preferred embodiments is merely exemplary in nature and is in no way intended to limit the invention, its implementations, or uses. Hence, a novel manner to numerically design a cabinet adapted sustain a predetermined arc flash will be described herein after. Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in different form in order to facilitate describing the present invention.

The features provided in this specification can relate to principles of methods, numerical analysis, computer code/ instructions and machine-readable code/instructions adapted to instruct a computer, many computers or other machines adapted to use the instructions to provide material effects on a display, or other means enabling human-computer interactions to simulate arc-flashes and design switchgears, also referred to as cabinets. These code/instructions are preferably stored on a machine-readable medium to be read and acted upon with a computer or machine having the appropriate code/instructions reading capability.

Figure 2:
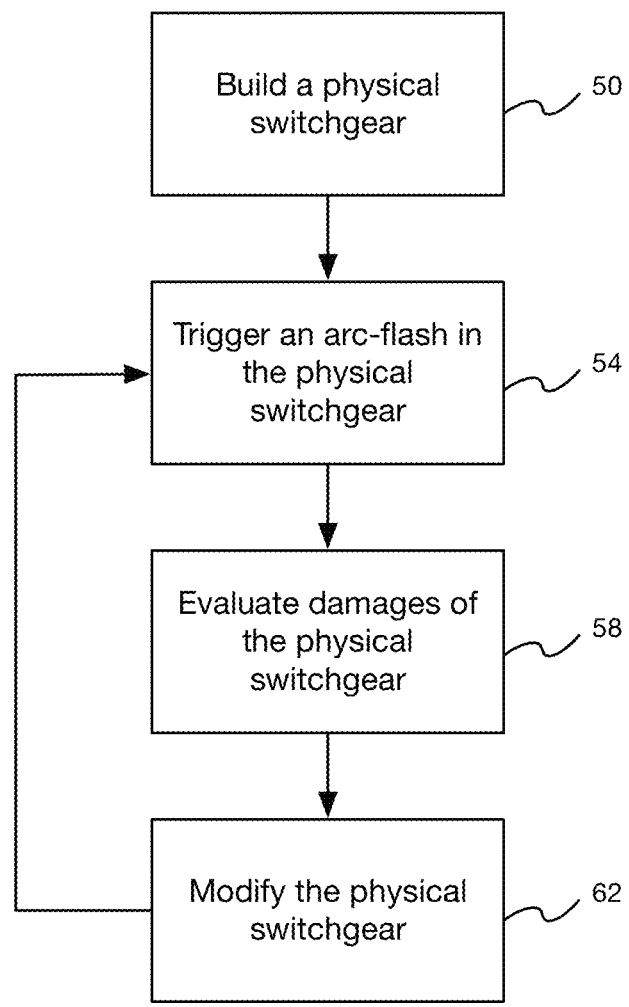
FIG. 2 is a flow chart of a prior art trial and error process.

A general cabinet 10 is illustrated in FIG. 1 and is shown with a substantially rectangular shape with a plurality of panels. In the illustrated embodiment, a top panel 14 is illustrated with side panels 18, 22, front panel 26 and a bottom panel 30. The rear portion 34 is including additional volumes 38, 42. Typically, a cabinet 10 is sized and designed by experimentation to make sure the cabinet 10 can sustain arc-flashes that can spark inside the cabinet 10 and provide a significant amount of energy therein in accordance with safety rational and regulations. An iterative process illustrated in FIG. 2 is used to build a physical switchgear 50, trigger an arc-flash in the physical switchgear 54 to evaluate the damages to the physical switchgear 58 and bring required modifications 62 until the physical damages are within acceptable limits. This iterative process is long and costly. The present invention is suggesting an advantageous alternative to design an arc-flash resistant switchgear 10 without going through the try and error process.

The arc-flash explosion is a high energy deposition electric cycle delivering pressure pulses at 60 Hz, or a period of ~16 milliseconds. To accommodate the rapid deposition of energy, the cabinets 10 are generally equipped with pressure relief panels. Therefore, the primary damage to the cabinet is experienced in the first pulse since the pressure relief panels provide a direct venting to atmosphere.

The cabinets 10 are required to withstand the arc-flash without venting to atmosphere by other openings, other than the pressure relief panels, and without allowing leakage between internal compartments. A typical worst-case time duration for response of breaker to interrupt the arc-flash is approximately between about 60 and 100 milliseconds, preferably about between about 70 and 95 milliseconds and more preferably between about 80 and 90 milliseconds and optimally about 85 milliseconds. Therefore, the simulations are generally carried out for about 83 milliseconds, or 5 full cycles of pressure loading.

The simulation of this short duration phenomenon is requiring the ability to solve arbitrary contact interaction amongst components and the ability to simulate a fluid domain interacting with the structure. Lagrange elements are used for the structural components and arbitrary Arbitrary-Lagrangian-Eulerian (ALE) elements are used to model the domain of the air interacting with the structure.

Figure 3:
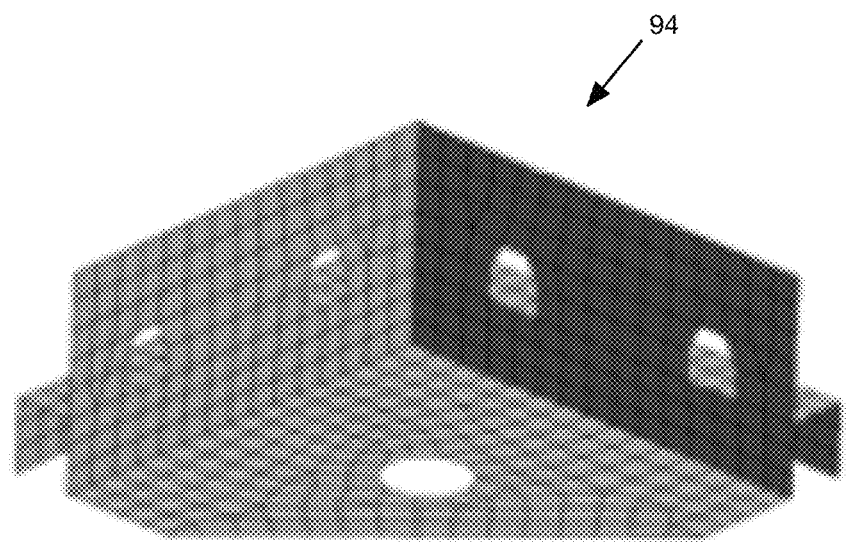
FIG. 3 is an isometric view of a meshed corner in accordance with at least one embodiment of the invention.
Figure 4:
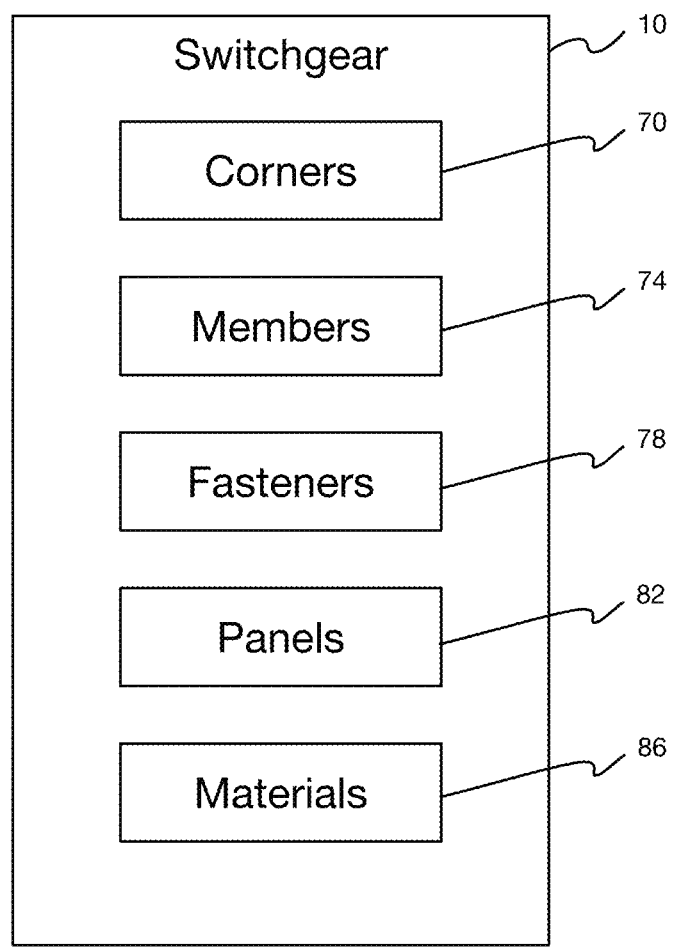
FIG. 4 is a bloc diagram of components of a cabinet in accordance with at least one embodiment of the invention.
Figure 5:
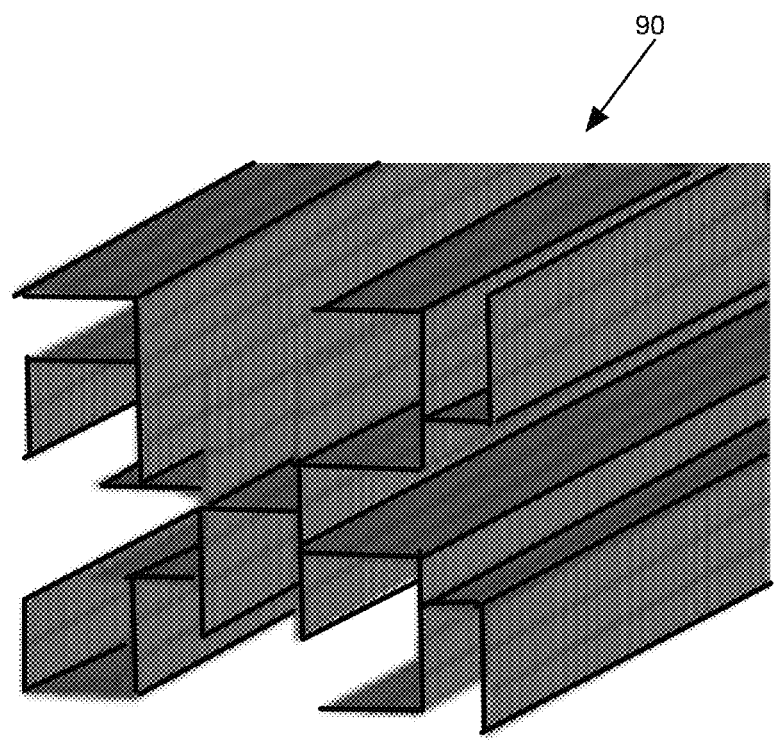
FIG. 5 is an isometric view of an extruded member in accordance with at least one embodiment of the invention.
Figure 6:
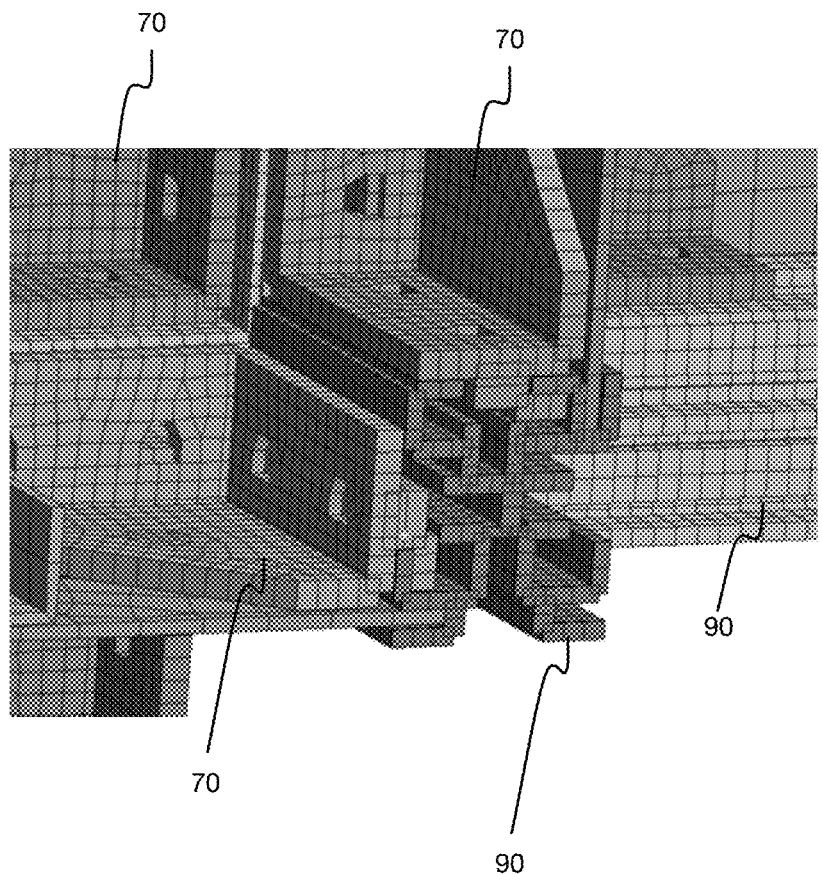
FIG. 6 is an isometric view of a meshed assembly in accordance with at least one embodiment of the invention.

As an illustrative example provided for sake of supporting the understanding of the present invention and embodiments thereof, the cabinets 10 (based on physical cabinets) are virtually modeled with shell, beam, corners 94, as illustrated in FIG. 3, members, fasteners, panels and solid elements as illustrated in FIG. 4. The material used for each element is of significant consequence and the aluminum extrusions 90, as illustrated in FIG. 5, and machined corners and steel panels are modeled with full integration shell elements. The bolts connecting the panels to each other and the corners are modeled with beam elements. All solid bodies, bus bars and electrical bushings, were set to have rigid behavior. The extrusions 90 were meshed with a nominal sizing of 15 mm. The corners have a sizing of 15 mm. The geometry was simplified from a solid body to a surface body as exemplified in FIG. 6. It is advisable that the dimensions used throughout the present description is for illustrative purpose and can vary in function of the application.

The fluid (air) is modeled with ALE solid elements for calculations. Compared to Lagrange elements which move with deformation, the ALE elements are fixed in space with material advection across element boundaries. An ALE domain is more comparable to a Computational Fluid Dynamics (CFD) domain in that way. The deposition of energy during the arc-flash causes a large expansion of gas which would cause intolerable distortion of Lagrange elements. The air domain of solid ALE elements is overlaid on the structural models.

The structural components of the cabinets are, for instance, built from aluminum and carbon steel. The panels are 1008 carbon steel and aluminum alloys are used for the corners (6061-T6) and extrusions (6005A-T6). A Johnson Cook plasticity model with strain rate dependency can be used for the aluminum and steel. Copper is defined with an elastic material model only. The plasticity model is given by the following:

$$\sigma = (a + b\varepsilon_p^n)\left(1 + c\,\ln\frac{\dot{\varepsilon}}{\dot{\varepsilon}_0}\right) \qquad \text{Equation 1}$$

Where:
σ s the resulting stress;
εp is the plastic strain;
{dot over (ε)} is the strain rate;
a is the plastic yield stress at the reference strain rate;
b is the plastic hardening exponent;
c is the strain rate coefficient; and
{dot over (ε)}$_0$ is the reference strain rate.
Material parameters are given in Table 1 below.

TABLE 1

| Material | Young's Modulus, GPa | Poisson's Ratio | Density, kg/m³ | a, MPa | b, MPa | n | c | $\dot{\varepsilon}_0$ 1/s | Total Elongation |
|---|---|---|---|---|---|---|---|---|---|
| 6005A-T6 Aluminum | 69 | 0.33 | 2700 | 240.0 | 244.0 | 0.427 | 0.083 | 1 | 8% |
| 6061-T6 Aluminum 1008/1010 Carbon Steel | 200 | 0.29 | 7870 | 266.5 | 456.4 | 0.472 | 0.018 | 1 | 20% |
| Copper | 110 | 0.37 | 8900 | — | — | — | — | — | — |

Total elongation is provided as general basis for evaluating the likelihood of material failure in reviewing plastic strain results. Material failure was not considered during the simulation with the presented embodiment. Due to the large deformation, single surface contact was defined amongst all surface bodies (sometimes called "general" contact). Single surface contact considers contact between any bodies at any location since a predetermination of the specific surfaces coming into contact is not practical. A friction coefficient of 0.2 was assumed, which is a conservatively low value.

Figure 7:
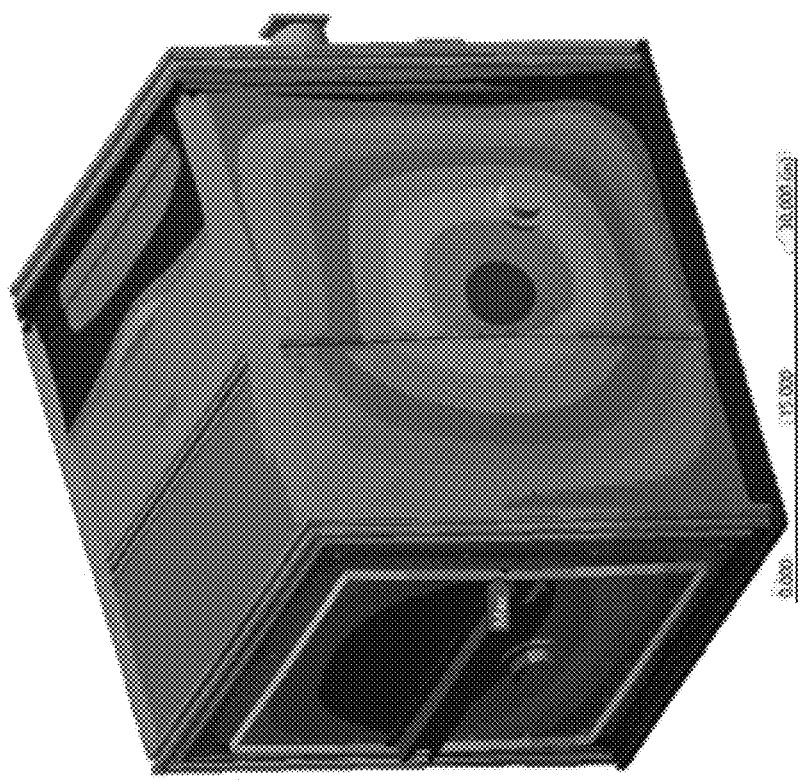
FIG. 7 is an isometric view of a cabinet with virtual stresses imposed by an arc-flash in accordance with at least one embodiment of the invention.
Figure 7:
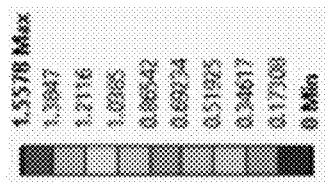

Bonded contact is used in the illustrated embodiment between rigid bodies and between rigid bodies and deformable bodies. Circular imprints on corner connections with a diameter of about 25 mm ("1 inch) were made around the bolt holes to represent the approximate diameter of the corresponding washer however other parameter could have been used. Then, a bonded contact pair was made between the two sides, red and blue, as exemplified in FIG. 7.

The ALE mesh interacted with the panels for the fluid structure interaction. The pressure in the ALE is transferring the load to the shell elements cabinet structure. The grooves within the extrusions are too small to accurately define a Constrained Lagrange in Solid (CLIS) with the ALE mesh. Therefore, to prevent leakage at the extrusions, a rigid solid body was defined which overlapped the cross-section of the extrusions to block air through the grooves and the joints next to the extrusions. A CLIS was defined on the faces of this rigid body. This technique does not impact the mechanical behavior of the stiffness of the structure and is solely used to achieve adequate fluid structure interaction with the charge transfer between under pressure air and the panel and other structural part of the cabinet. The panels and rigid body create an "airtight" domain, in this case the volume in which the subject arc-flash occurs and is contained, whereby venting can only be accomplished by opening the fuse panels or overloading the panels causing them to disengage from extrusion grooves. A similar configuration was used for the Simple cube geometry.

Figure 8:
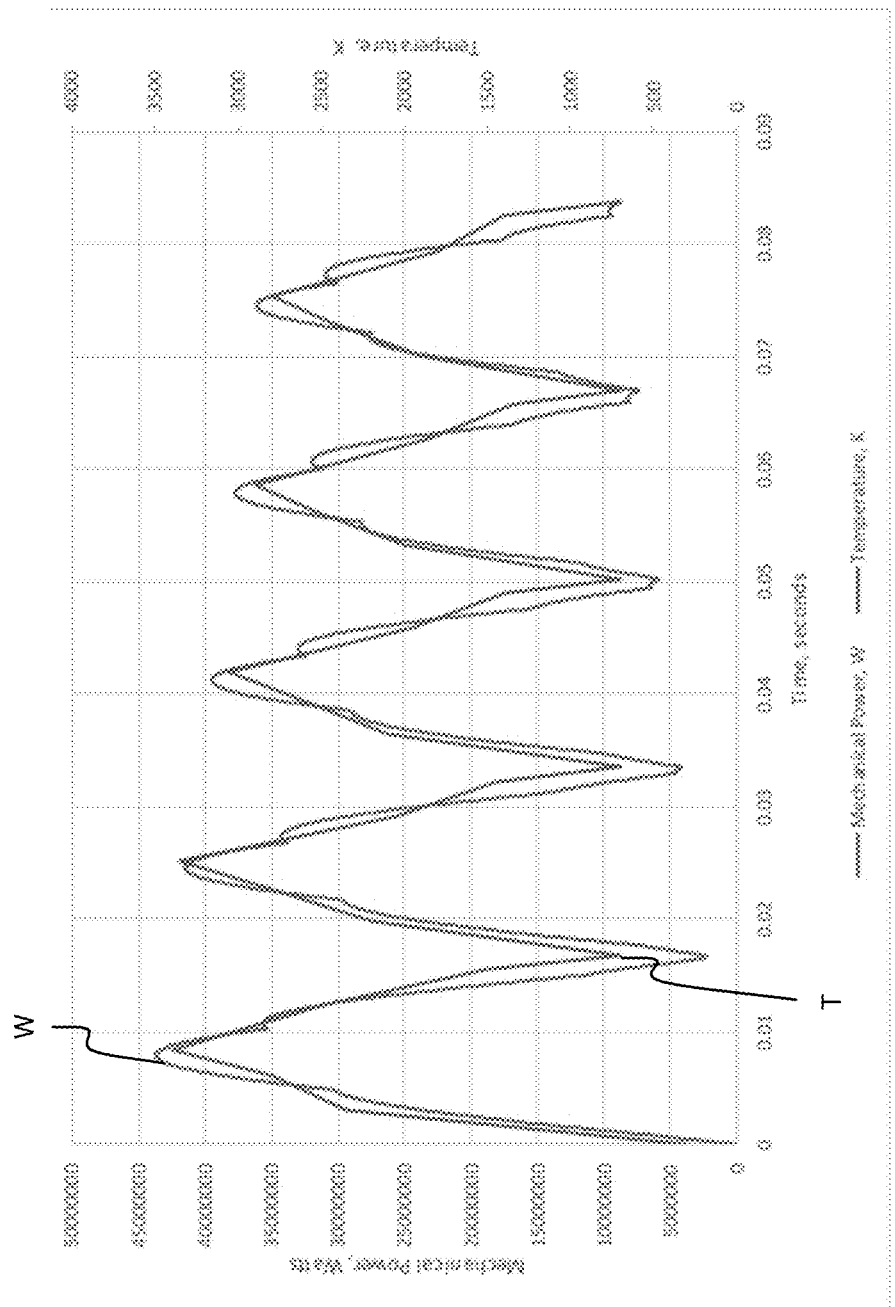
FIG. 8 is a graph illustrating mechanical power chart matching the temperature chart over time.

Moving now to the initial conditions in the exemplary numerical analysis that is considering a structural element that is using structural elements with zero initial velocity, the cabinet being at rest under the influence of gravity only. In the illustrated embodiment, the initial pressure in the air is atmospheric (101338 Pa) and the initial temperature is 288.2 K. The loading from the arc-flash is simulated via a geometrically shaped (i.e. cubic) ambient boundary condition localized at the location of the arc at which is a specific condition for inputting energy on which the input energy will be applied. The ambient boundary condition does not directly input energy into the air domain. Rather, it specifies the energy of the specific arc-flash elements and then the energy diffuses into the rest of the air domain. Therefore, the ambient energy has to be calibrated iteratively from the energy transfer into the air domain to get closer and substantially match the desired energy magnitude and history of deposition since the energy diffusion depends on the size, volume and shape of the domain. Since an ideal gas is used, for instance the ideal gas EOS, although another gas could be used with corresponding adjustments and remain within the scope of the present description, the ambient loading is done by specifying a temperature and temperature variation time history, as illustrated in FIG. 8. The temperature is multiplied by specific heat to calculate energy units at the arc-flash.

The arc-flash location in the numerical model is represented with a "small" original volume at a known location, generally near the electric bridge, the location between two (2) phases where an electric arc-flash can occur, at the arc-flash location in ambient cabinet environment. The decision regarding the location of the arc is based on the experience of the analyst regarding typical areas where an arc-flash event could occur, and several locations can be evaluated during a cabinet development process. The original volume can be, for example, of about 20 millimeters×20 millimeters×300 millimeters length, which can cooperate with the size of the finite elements in the air domain. This original volume dimension allows a balanced computational cost. A smaller original volume could improve the precision of the computation, but the computational cost would generally be higher. The temperature can be controlled in the ambient environment and can be adjusted in function of the time in the volume to achieve overall energy deposition. The necessary temperature input required to generate the intended energy deposition cannot be known in advance because it depends on the volume of the cabinet as per the ideal gas law. A simulation is made to monitor energy deposition for a given temperature function. Knowing the target energy for the volume, then, a factor is determined to increase or decrease temperature, depending on the error on the total energy deposited into the air domain. The simulation is repeated with the temperature adjustment. This iterative process is repeated until acceptable error exists between the desired and simulated total energy deposition. Acceptable error depends on the particularity of the case and can be between about 1% to 5 about %, preferably between about 1% and about 3% and more preferably between about 1% and about 2%.

The effective mechanical power, which results in pressure loading, is estimated to be about 50% of the electrical power, as illustrated in FIG. 8. Ratios of mechanical power to electrical power can be between about 30% and about 70%, preferably between about 40% and about 60% and more preferably between about 45% and about 55%. As it can be appreciated in FIG. 8, the shape of the temperature history curve matches well with the shape of the power curve.

Figure 9:
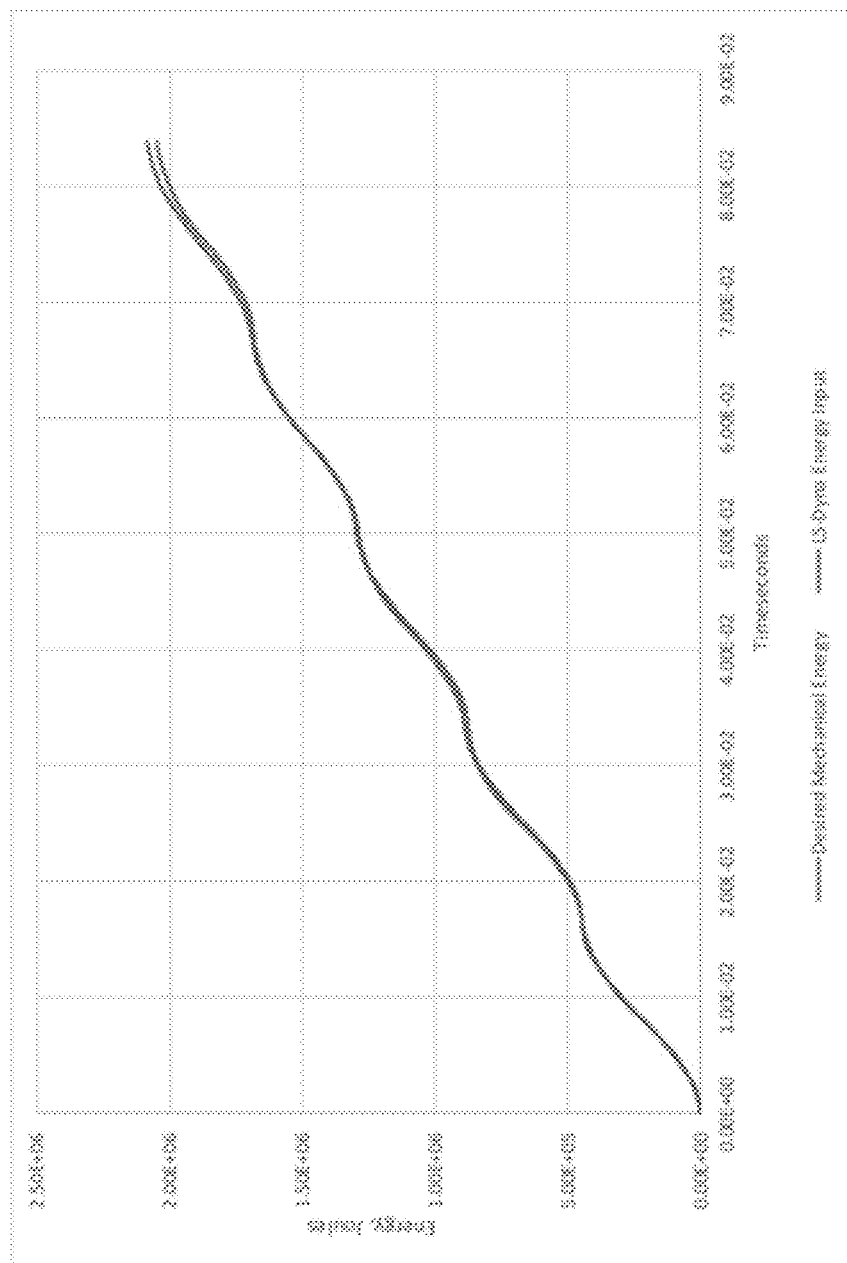
FIG. 9 is a graph illustrating the integration over time of the data provided in FIG. 8.

A non-reflecting boundary was specified on the six exterior faces of the air domain to account for air exiting and entering the domain without pressure waves being reflected. With such a boundary condition, energy is also allowed to leave the domain. For the energy calibration, a rigid fixed boundary was assumed instead, which made sure that all the deposited energy was conserved. The desired amount of energy shown in FIG. 9 was determined based on numerical integration of the power in FIG. 8. The corresponding energy input shown in FIG. 9 was determined based on the temperature input in FIG. 8 and compares very well with the desired energy. All calculations used the same shape of the temperature input curve but are iteratively adjusted in magnitude to achieve the desired energy input.

Figure 10:
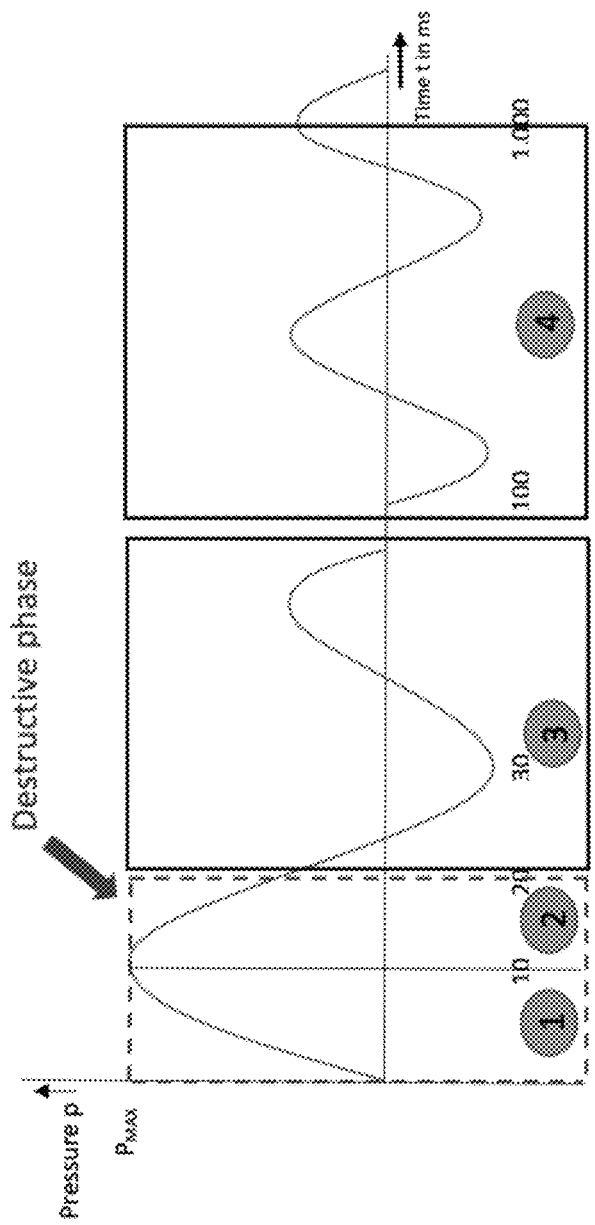
FIG. 10 is a schematic illustration of pressure/time graph in accordance with at least one embodiment of the invention.
Figure 11:
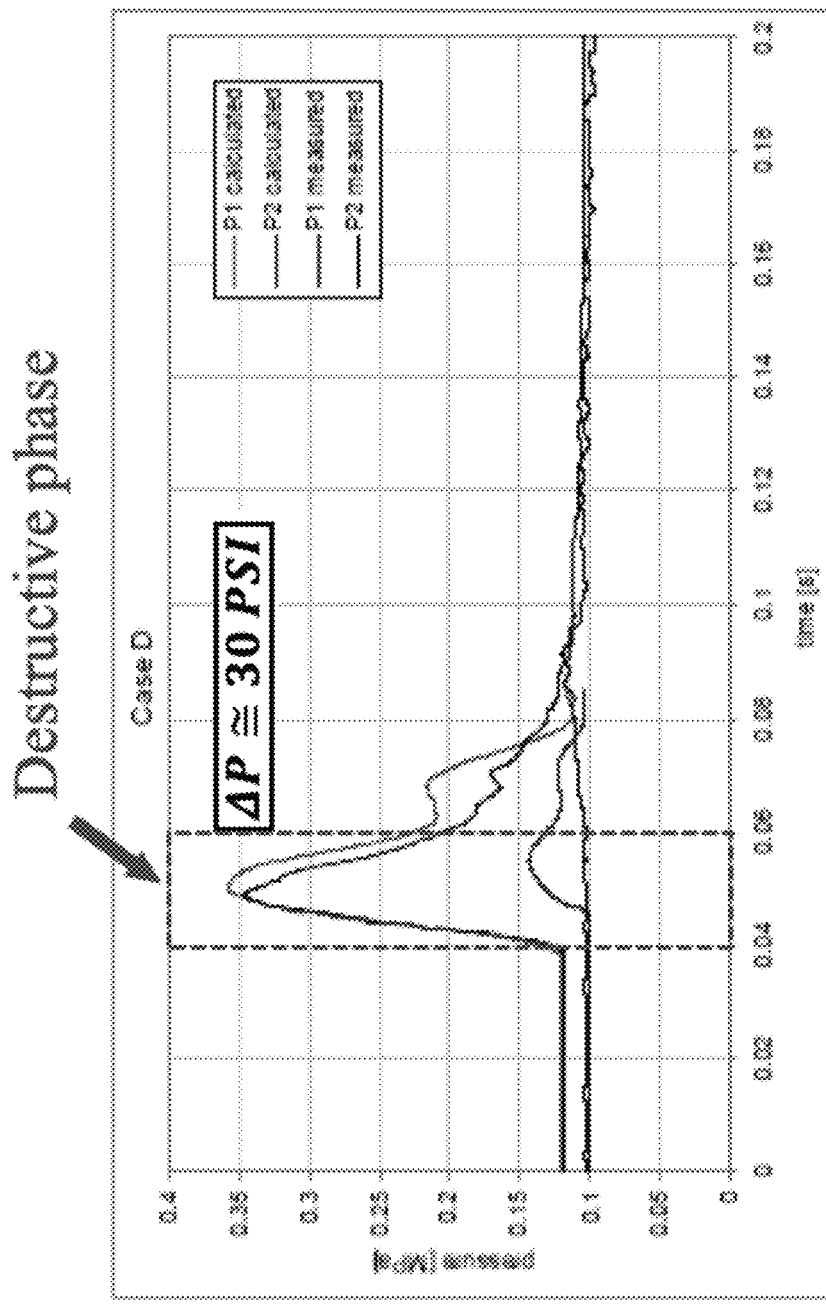
FIG. 11 is a schematic illustration of pressure/time graph in accordance with at least one embodiment of the invention.
Figure 12:
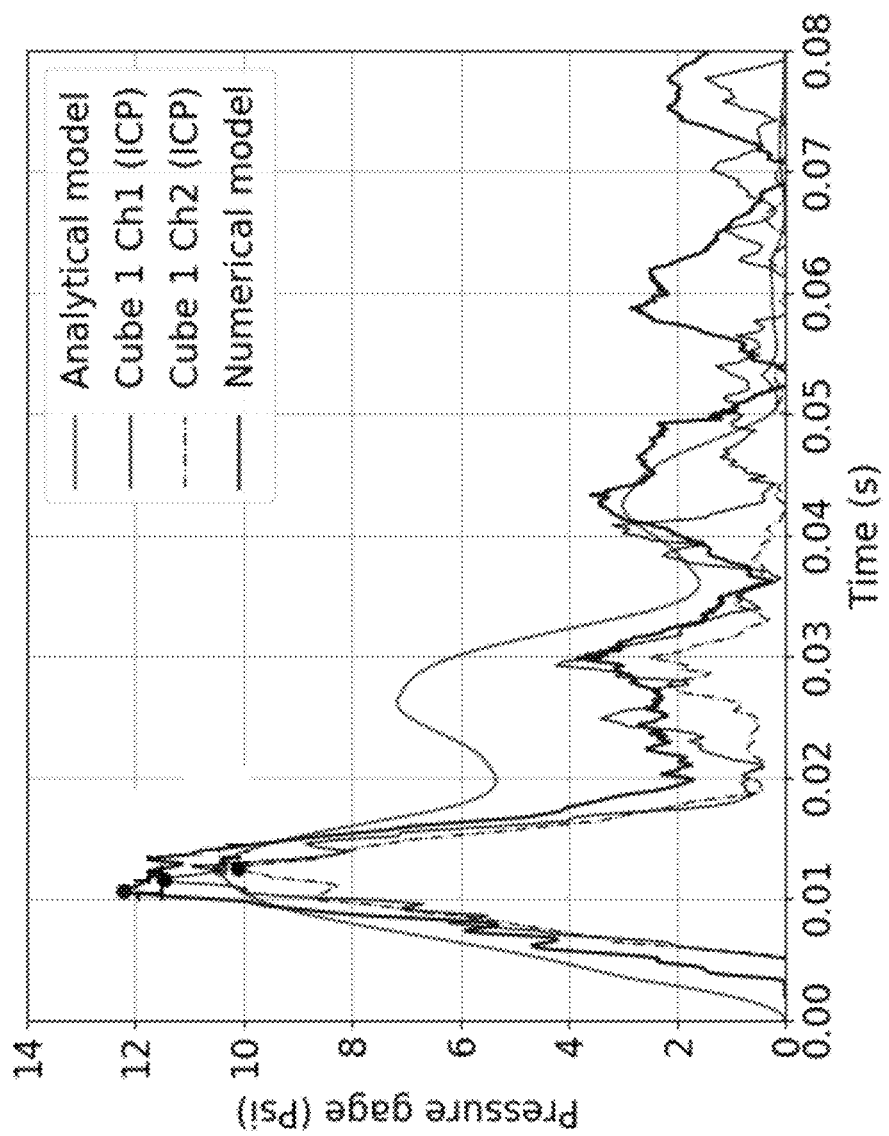
FIG. 12 is a schematic illustration of pressure/time graph in accordance with at least one embodiment of the invention.

The available results for the simple test are pressure history and the observation that the cabinet passed the test with no substantial deformation or leakage. Therefore, this data is used for comparison to the numerical results. An experimental test serves an additional role in determining the correct pressure transducers to use during the test. The test showed that standard pressure transducers were not capable of accurately measure the pressure compared to piezoelectric (ICP) sensors. An analytical (control volume) mathematical model was also used to predict the pressure history. A typical graph of the wave pressure of the destructive phase is illustrated in FIG. 10. Calculated pressures and physical tests measures are illustrated in FIG. 11 and test pressure results of the cube model are illustrated in FIG. 12.

Figure 13:
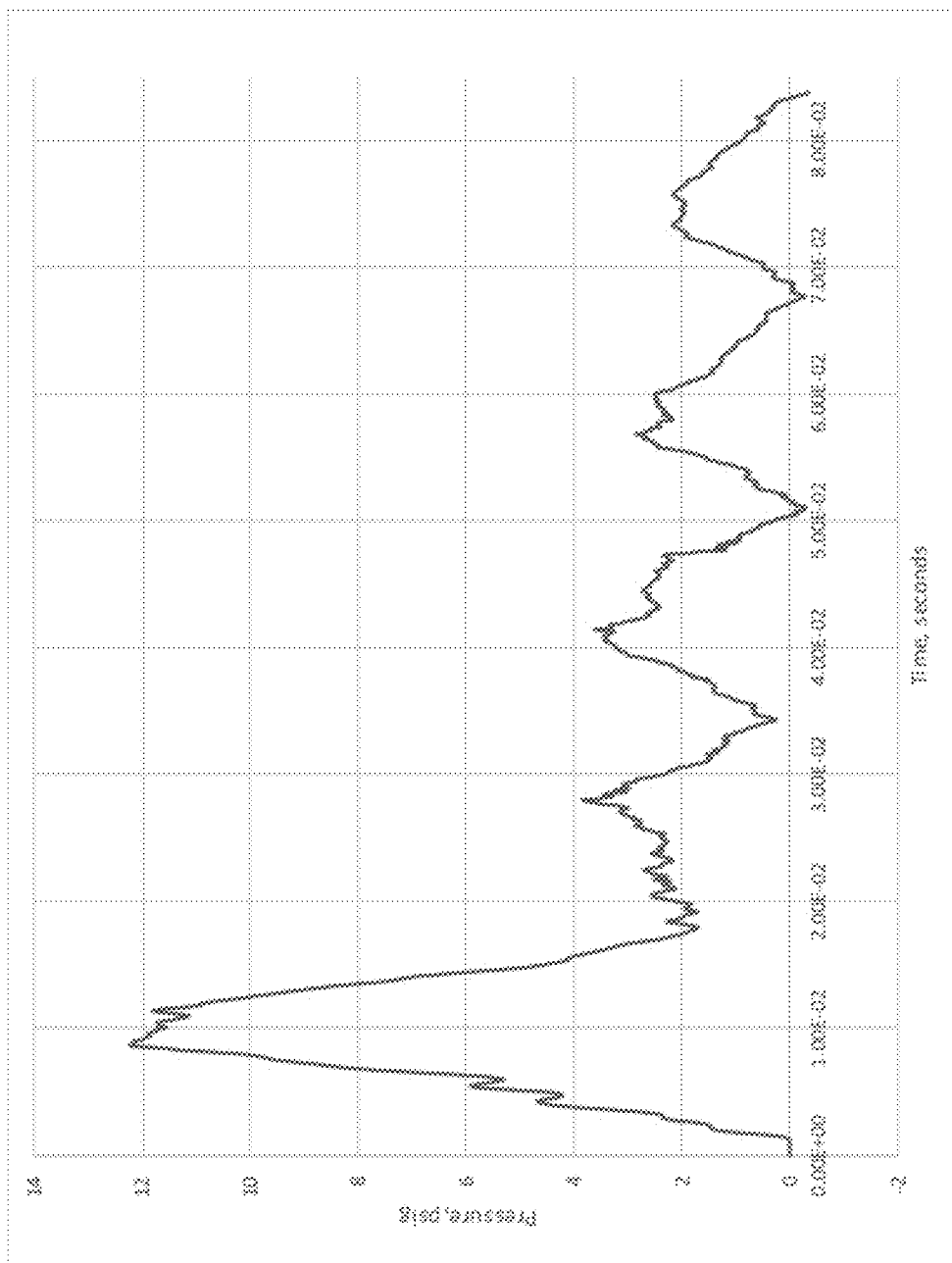
FIG. 13 is a schematic illustration of pressure/time graph in accordance with at least one embodiment of the invention.
Figure 14:
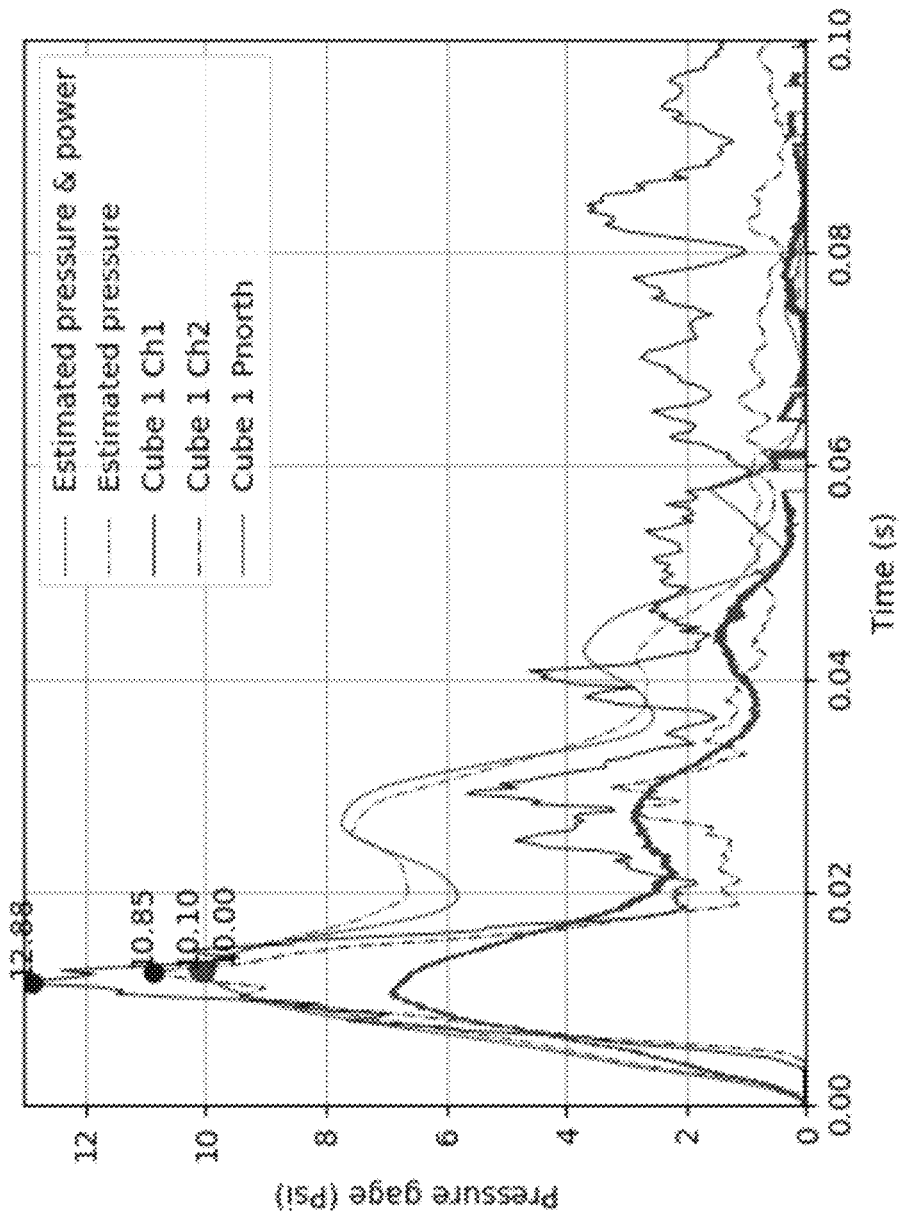
FIG. 14 is a schematic illustration of pressure/time graph in accordance with at least one embodiment of the invention.

The Pwest and Pnorth pressure curves are obtained from standard pressure sensors. There is generally a 40% difference between piezoelectric sensors and standard sensors for the peak pressure. Since the analytical model is a control volume approach, it has no spatial dependency. The analytical model (10.42 psi) compares well with the average maximum pressure (10.79 psi) from the piezoelectric sensors. FIG. 13 is illustrating the pressure function of time of the numerical model. FIG. 14 shows the pressure results at the Channel 1 location. The maximum pressure of 12.22 psi compares well with the maximum ICP value of 11.47 psi. The numerical results also show same trend as test results in that there is a significant decrease in pressure between the successive peaks.

As for the simple cube mode, the cabinets were illustratively modeled with shell, beam, and solid elements. The aluminum extrusions and machined corners and steel panels are modeled with full integration shell elements. The bolts connecting the panels to each other and the corners are modeled with beam elements. For the simple cube models, reduced integration solid elements are used to model the bus bars. Therefore, the bushings are assumed to be rigid and the bus bars are deformable. For the Simple cube models, the additional flexibility of the bus bars was desired since they span large distance and connect deformable components.

The extrusions in the illustrated example were meshed with a nominal sizing of 5 mm. The element size was chosen to ensure at least 2 elements across each leg of the extrusion. The geometry was simplified from a solid body to a surface body as shown in FIG. 5. The corners have a sizing of 5 mm. The element size was chosen to ensure at least 2 elements across each leg of the corner tabs. The geometry was simplified from a solid body to a surface body as shown in FIG. 3.

The screw holes are used to insert screws to lock the corners into the grooves of the extrusions. Without the presence of the screws, the corners can easily disengage from the extrusions when loaded in the proper direction. For the simple cube configuration, all corners were loaded opposite the direction of the arrows. Therefore, there was no tendency to disengage. For the Simple cube configurations, the corners are sometimes loaded in a direction and tend to disengage without the screws. To simulate the effect of the screws, the shell elements on the leg of the tabs were increased from the nominal thickness of 5.16 mm (0.203 in) to 12.46 mm (0.49 in) and offset from the mid-surface location.

The attachment of deformable solid bodies to rigid solid bodies was done with a "Rigid Body Additional Nodes" object. The resulting effect is the selected nodes on the deformable body are rigidly attached to the rigid body. The attachment of rigid solid bodies to rigid solid bodies was done by merging objects. The resulting effect is the slave rigid body is rigidly connected to the master rigid body. The steel panels were attached to the corners via a beam connection. A beam element is used to connect A Constrained Nodal Rigid Body (CNRB) at junction location is much stiffer connection than would be represented with an actual bolt model that could potentially tear out of one side. The CNRB will also pull in tension on the opposite side of the loading direction. Therefore, forces through these connections can only be monitored and evaluated against a failure criterion.

A simple assessment of the exemplary corners was completed to provide insight into the failure load of this connection. A multi-mode failure is assumed where the fastener can either tear-out of the hole or the ligament can bend until a failure strain is reached on the outer fiber. First, consider shear tear-out. A hand-calculation is used where the minimum ligament thickness is 13.06 mm. The thickness of the corner is 6.35 mm. The resulting calculations are shown below. Therefore, for a pure shear tear-out, the required force is 25 kN.

TABLE 2

Corner Shear Tear-out

| Ligament Thickness | 13.06 mm | |
| Corner Thickness | 6.35 mm | |
| Shear Area (Double) | 165.88 mm^2 | |
| Ultimate Tensile Strength | 262.0 MPa | |
| Ultimate Shear Strength | 151.2 MPa | 0.577*UTS |
| Tear-out Force | 25077.5 N | |

The bending failure was evaluated with a simple FEA model. A normal force was applied to the bolt hole. The average equivalent plastic strain through the limiting ligament was monitored until it reached 8%. At this point, the force was equal to 27.2 kN which is the failure load for a pure bending failure. A simple combined failure model, shown below, is used to evaluate the mixed mode failure.

$$\text{Mixed Mode Failure} = \left(\frac{\text{Shear Force}}{\text{Tear Out Force}}\right)^2 + \left(\frac{\text{Axial Force}}{\text{Bending Failure Force}}\right)^2 - 1 \leq 0 \quad \text{EQUATION 2}$$

When the mixed mode failure parameter exceeds zero, a risk of failure occurs. This failure criterion is considered conservative due to the use of minimum material properties and the exclusion of interaction between the corner and panel in the bending case. Using a conservative criterion is not predictive. However, comparing the failure criterion to test results is considered valuable in a qualitative assessment of the corners and provides confidence in using the criteria in future evaluations. The initial conditions of the structure has zero initial velocity. The initial pressure in the air is atmospheric (101338 Pa). The initial temperature is 288.2 K.

Figure 15:
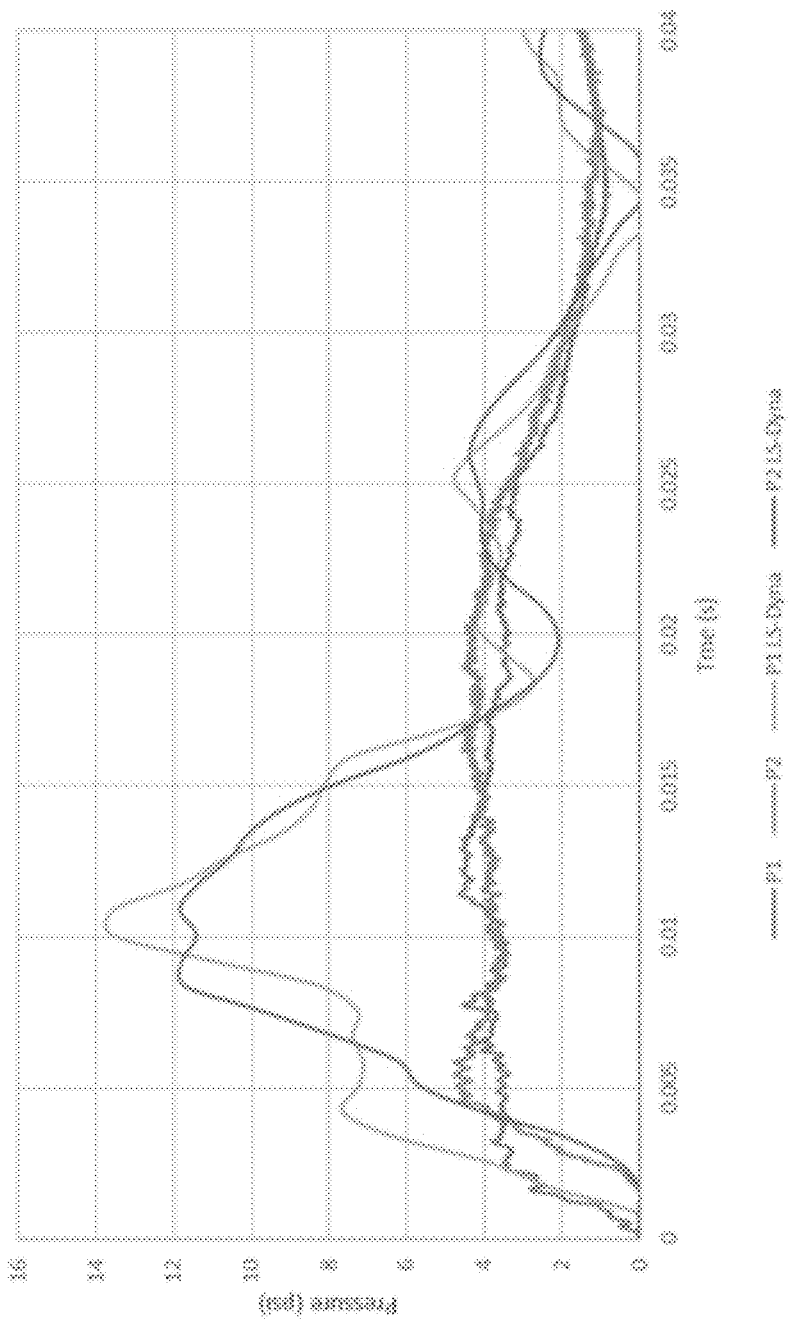
FIG. 15 is a schematic illustration of pressure/time graph in accordance with at least one embodiment of the invention.

The Simple cube Main Bus Compartment Fail Configuration results include a pressure history in the main bus compartment and pictures of failed regions. The pressure comparison between experimental measurements and numerical results is given in FIG. 15. The numerical pressure results are about 180% higher than the test results. Unfortunately, the pressures were recorded during the test using standard pressure sensors instead of piezoelectric sensors and are known to not be capable of capturing the peak pressures under these test conditions. Beyond the initial pressure peak ending at 20 milliseconds, there is reasonably good correlation between analysis and test in the magnitude of the successive pressure peak of approximately 4 psig.

Figure 16:
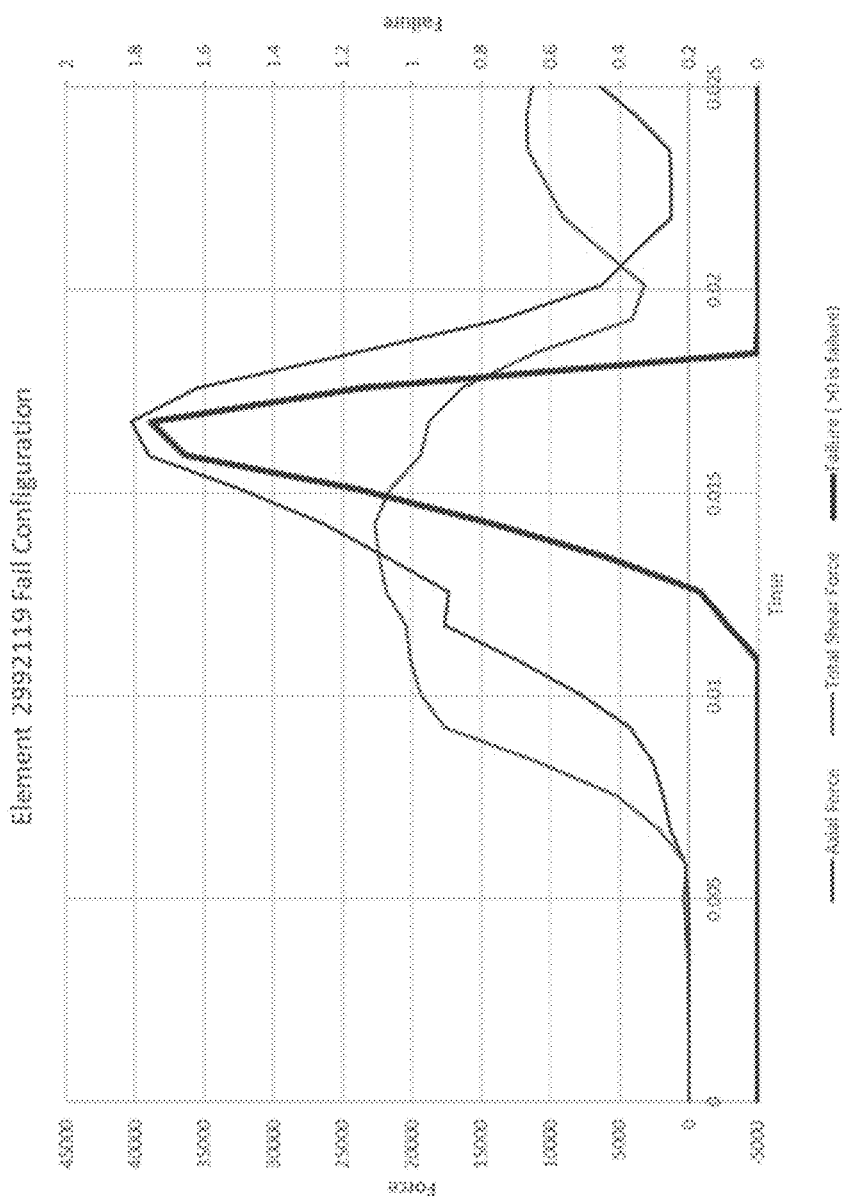
FIG. 16 is a schematic illustration of force/time fail graph in accordance with at least one embodiment of the invention.

The axial force direction is along the axis of the beam. The s and t directions are orthogonal to the axial direction and within the planes of the panels. During setup of the beams, the s and t directions are not controlled. The vector magnitude of the s and t directions is used to calculate a total shear force. The axial force (40.3 kN) in the failed corner is considerably higher than the failure load 27.2 kN. Additionally, the maximum shear force (22.2 kN) is near the tear-out failure force of 25 KN. FIG. 16 shows the time history of the failure criterion on the failed corner location.

With a failure criterion value of approximately 1.8 compared to an allowable value of less than zero, this corner could have been predicted to be at risk for failure. After disengagement of the panel from the extrusion groove, the force on the corner increases greatly. Further review of other Simple cube configurations, covered in the next section, indicates that disengagement of the panel from the extrusion groove is a stronger indicator of corner failure. The forces on the corner increase greatly after this occurs.

The fuse panel is removed from view since they are designed to experience large plastic strain. The side panels are removed for visibility. The contour scale is set to a maximum of 8%, which is the most conservative total elongation value. The peak plastic strain of ~21% is located on the corner at the failure location, further supporting the conclusion that this location is overloaded.

The simulation was repeated with these added parts. For the test, the fuse panels were attached with hinges to allow for easier opening. However, the model excluded the hinges and included the original failed configuration fuse panel. The fuse panels are 0.76 mm (0.03 inches) thick and do not require much effort to bend. A review of the fuse panel's shape suggests that the primary resistance to opening is the inertial mass and not the resistance due to bending. About half of the width of the panel is moving as a plane outward and not in a rotational manner. The exclusion of the hinge is judged to have a negligible effect on the pressure loading inside the cabinet.

Figure 17:
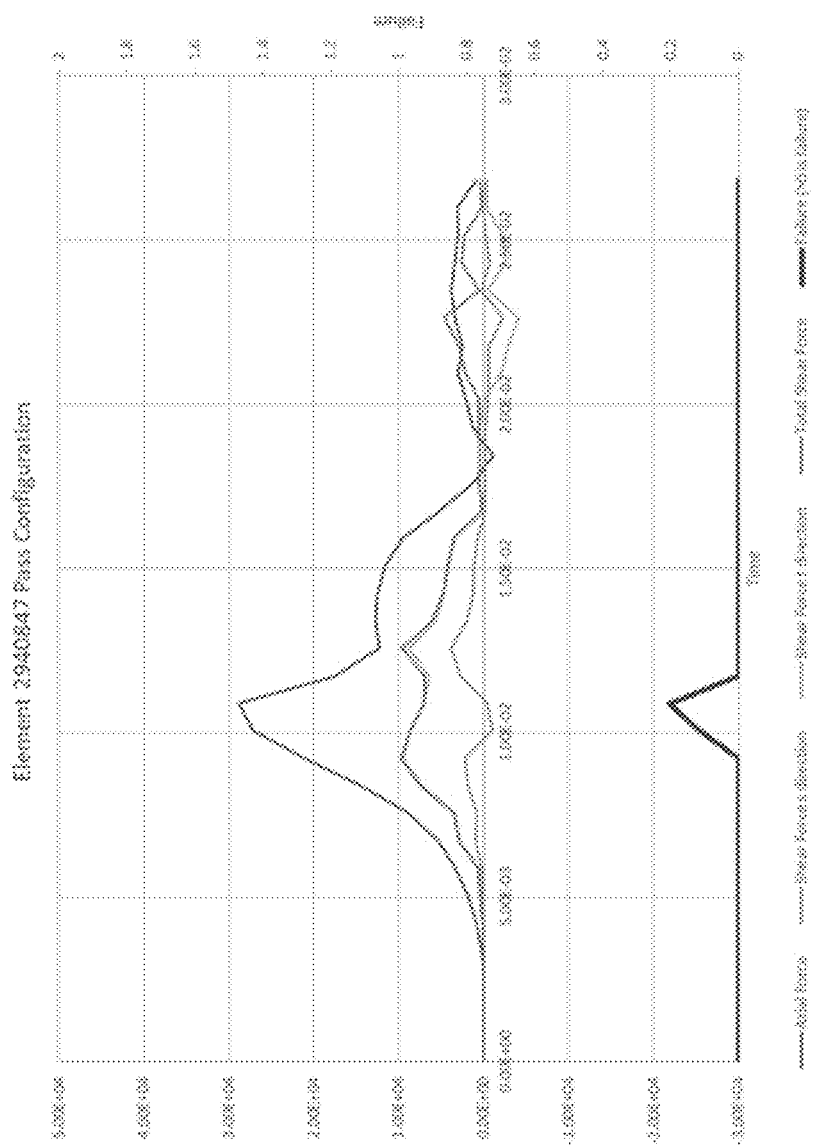
FIG. 17 is a schematic illustration of failure/time pass graph in accordance with at least one embodiment of the invention.

All the panels remain in the extrusion grooves. Additionally, the corner forces were evaluated. The corner in the center of the right panel is the only highly loaded location. The time history of the failure criterion is given in FIG. 17 for this location. The failure criterion does predict a marginal failure at this location, although there was no identified failure during the test. Therefore, the analysis is conservative with respect to failure at this location.

The fuse panel is removed from view since they are designed to experience large plastic strain. The side panels are removed for visibility. The contour scale is set to a maximum of 8%, which is the most conservative total elongation value. The peak plastic strain of ~11% is located on the steel panel at a fastener location. The aluminum components have a peak plastic strain of 4%, again at a fastener location for which the corner failure criterion applies.

Figure 18:
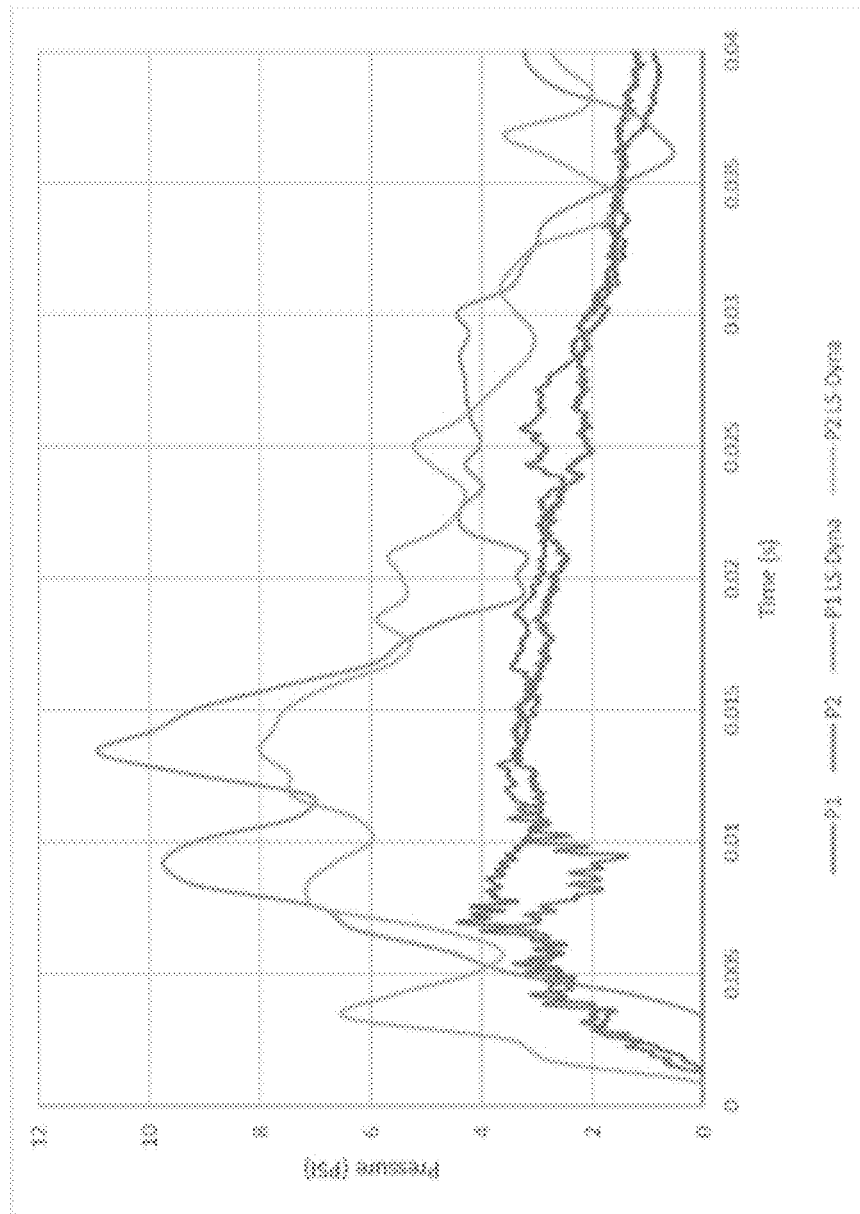
FIG. 18 is a schematic illustration of pressure/time graph in accordance with at least one embodiment of the invention.

Simple cube Cable Compartment Results: Simple cube Cable Compartment Fail Configuration. The fail configuration results include a pressure history in the cable compartment and pictures of failed regions. The pressure comparison is given in FIG. 18. The numerical pressure results are about 150% higher than the test results. Unfortunately, the pressures were recorded during the test using standard pressure sensors instead of piezoelectric sensors and are known to not be capable of capturing the peak pressures under these test conditions.

Other panel failure locations from the test were not explicitly identified in the test report. However, the pass configuration included modifications to the attachments to the failed locations, which suggests such leakage failures may have occurred. At the hinge location, a gap opens which also causes a leakage failure. The opening displacement is predicted to be "½ inch.

Figure 19:
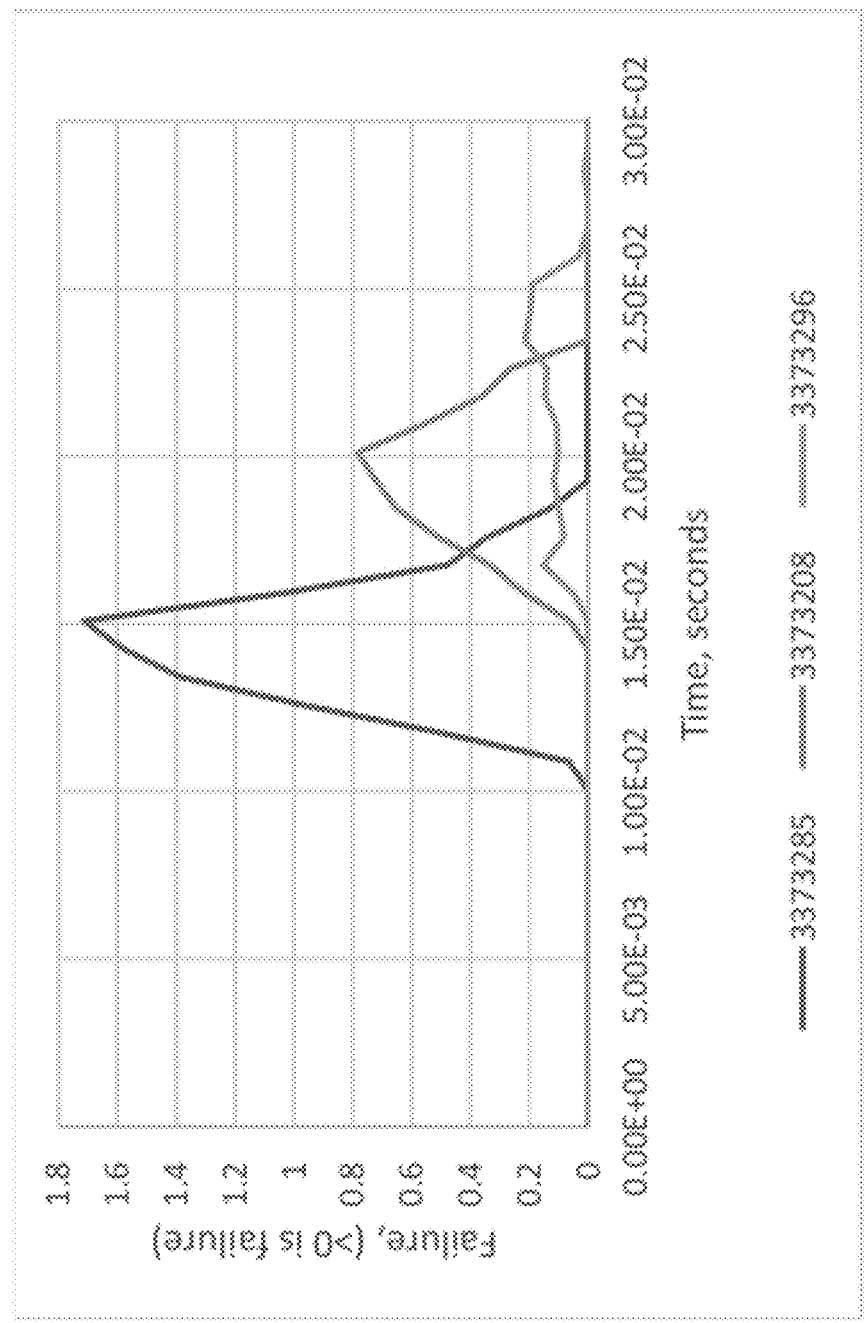
FIG. 19 is a schematic illustration of failure/time graph in accordance with at least one embodiment of the invention.

The axial force direction is along the axis of the beam. The s and t directions are orthogonal to the axial direction and within the planes of the panels. During setup of the beams, the s and t directions are not controlled. The vector magnitude of the s and t directions is used to calculate a total shear force. The maximum axial force (40.5 kN) occurs on a fastener attaching the panel to the door. The load is considerably higher than the failure load 27.2 kN. The maximum shear forces do not occur at the same location; therefore, the failure criterion will be evaluated at these three locations. FIG. 19 shows the time history of the failure criterion on these locations. For clarity since there are three locations, only the failure criterion is plotted.

Figure 20:
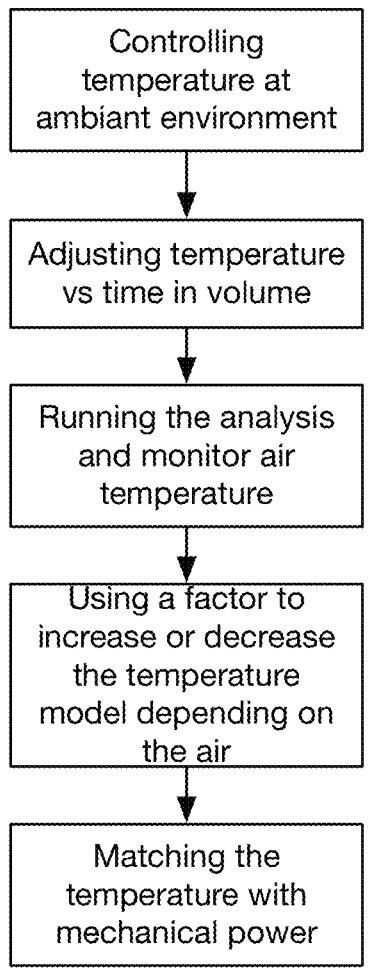
FIG. 20 is a flow chart illustrating the use of temperature matched to mechanical power in accordance with at least one embodiment of the invention.
Figure 21:
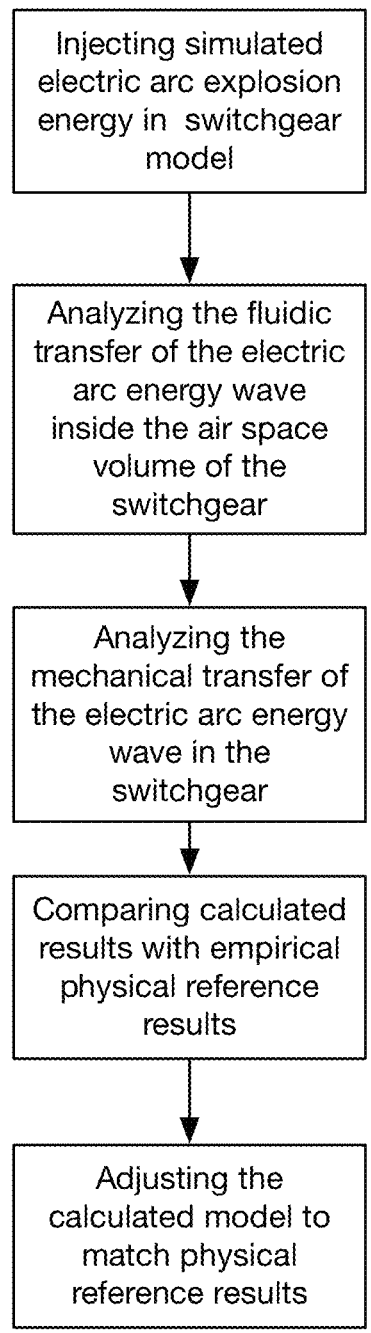
FIG. 21 is a flow chart illustrating the use of air domain to physical domain adjusted to match physical reference results in accordance with at least one embodiment of the invention.
Figure 22:
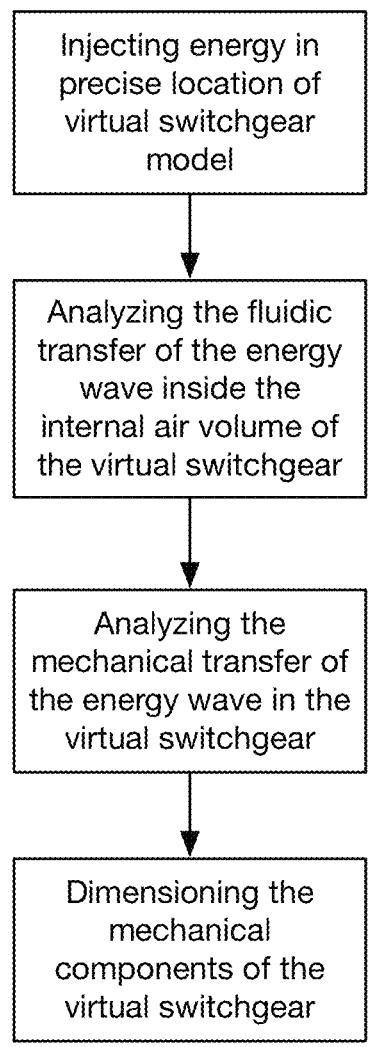
FIG. 22 is a flow chart illustrating the use of air domain to physical domain adjusted to match physical reference results in accordance with at least one embodiment of the invention.
Figure 23:
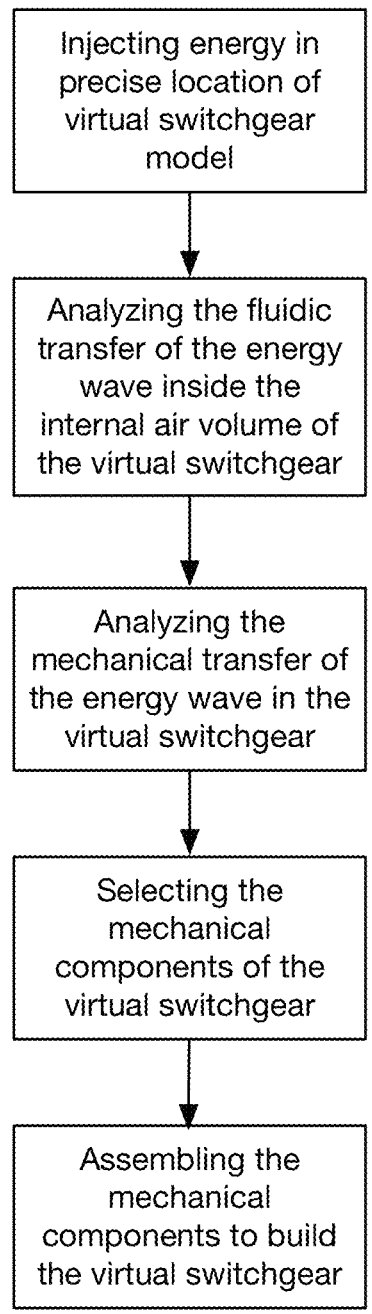
FIG. 23 is a flow chart illustrating the use of air domain to physical domain adjusted to match physical reference results in accordance with at least one embodiment of the invention.
Figure 24:
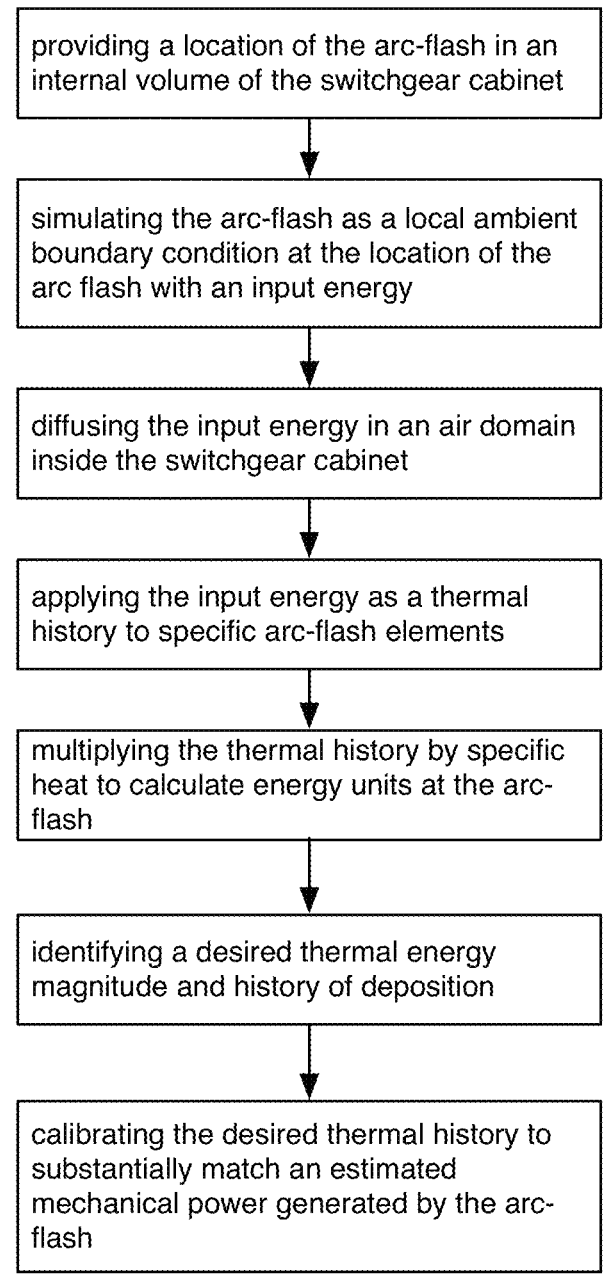
FIG. 24 is a flow chart illustrating the use of air domain to physical domain adjusted to match physical reference results in accordance with at least one embodiment of the invention.

With a failure criterion value of approximately 1.7 compared to an allowable value of less than zero, this corner on the door panel would be at risk for failure. However, no failure was reported at this location. A further review of this location indicates that the groove of the extrusion for this panel is approximately twice as deep as the extrusions for the other panels. Therefore, disengagement of the door panel is much more difficult. After review of both fail configurations (main bus and cable), it appears that a stronger indicator of corner failure is disengagement of the panel from the extrusion groove in the presence of high forces. It is likely that corner failure cannot occur without panel disengagement. A series of flow charts are illustrated from FIG. 20 to FIG. 23. FIG. 20 is depicting a flow chart exemplifying a series of steps used to match the temperature with the mechanical power in accordance with embodiments of the invention. FIG. 21 is illustrating a series of steps for adjusting a calculated model to match physical reference results. FIG. 22 is illustrating a series of steps for transferring an energy wave from the air volume to the mechanical components of the cabinet. FIG. 23 is showing a series of steps for selecting mechanical parts to build a physical cabinet based on the fluidic energy wave transfer in the model.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A method for manufacturing a switchgear cabinet that would be able to sustain a stress caused by an arc-flash with energy transmission thereof involving a simulation on a computing device, the method comprising:
    generating a meshed computing model of an initial physical switchgear cabinet and providing to the computing device the meshed computing model of the physical switchgear cabinet having a meshed internal volume defining an air domain therein, the air domain having a set of initial ambient conditions associated therewith;
    providing to the computing device an input energy value of the arc-flash;
    providing to the computing device an identification of an arc-flash location for the arc-flash to take place in the internal volume of the model of the physical switchgear cabinet;
    the computing device performing the simulation, comprising:
        the computer device computing the meshed computing model of the physical switchgear cabinet made of a plurality of using Lagrange elements;
        the computing device computing a meshed computing model of the air domain using made of a plurality of Arbitrary-Lagrange-Eulerian (ALE) solid elements;
        the computing device overlaying the plurality of ALE solid elements over the plurality of Lagrange elements;
        the computing device computing ambient boundaries of the arc-flash, and an initial location ambient boundary condition associated therewith;
        the computing device computing diffusion in the air domain of the input energy of the arc-flash into thermal energy over the plurality of Lagrange elements and the plurality of ALE solid elements, and registering said diffusion as a thermal history of deposition;
        the computing device multiplying data of the thermal history of deposition by a specific heat value thereby calculating energy values;
        the computing device computing a thermal energy magnitude of the arc-flash;
        the computing device calibrating iteratively the ambient conditions for the energy to diffuse into the air domain until the thermal history of deposition matches the thermal energy magnitude of the arc-flash within an acceptable error range; and
        the computing device rendering the providing simulation data of the meshed simulation model made of the plurality of Lagrange elements; and
    manufacturing the switchgear cabinet according to the simulation data.

2. The method of claim 1, further comprising the computing device computing the identified thermal energy magnitude using a numerical integration of an estimated mechanical power generated by the arc-flash.

3. The method of claim 1, wherein the step of calibrating iteratively the ambient conditions for the energy diffusion comprises iterating a thermal energy value of the arc-flash with a different thermal energy value until a correlation is found between a desired total energy deposition and the thermal history of deposition.

4. The method of claim 3, wherein the computing device is iteratively processing until an error range of at most 2% is obtained.

5. The method of claim 1, wherein the step of providing the identification of the arc-flash location comprises identifying a physical location of an electric bridge in the physical switchgear cabinet, and providing a location in the model corresponding to that physical location.

6. The method of claim 1, further comprising the computing device using an ideal gas in the air domain.

7. The method of claim 1, wherein the computing device is modeling the arc-flash boundary condition with a geometrical shape.

8. The method of claim 2, wherein the mechanical power is between 40% and 60% of an electrical power.

9. The method of claim 1, further comprising the computing device integrating non-reflecting boundary conditions on exterior surfaces of the air domain.

10. The method of claim 1, further comprising setting a non-reflecting boundary over at least a surface of the air domain.

11. The method of claim 1, further comprising setting a rigid fixed boundary over at least a surface of the air domain.

12. The method of claim 1, wherein the step of computing diffusion in the air domain of the input energy of the arc-flash comprises applying a Johnson Cook plasticity model to the plurality of Lagrange elements.

* * * * *